United States Patent [19]
Weidinger et al.

[11] Patent Number: 5,984,067
[45] Date of Patent: Nov. 16, 1999

[54] FRICTION CLUTCH WITH AUTOMATIC WEAR COMPENSATION

[75] Inventors: Reinhold Weidinger, Unterspiesheim; Michael Weiss, Dittelbrunn, both of Germany

[73] Assignee: Mannesmann Sachs AG, Schweinfurt, Germany

[21] Appl. No.: 09/120,578

[22] Filed: Jul. 22, 1998

[30] Foreign Application Priority Data

Jul. 23, 1997 [DE] Germany .............................. 197 31 610

[51] Int. Cl.[6] ..................................................... F16D 13/75
[52] U.S. Cl. ..................................... 192/70.25; 192/111 A
[58] Field of Search ........................... 192/70.25, 111 A, 192/89.23, 89.24

[56] References Cited

U.S. PATENT DOCUMENTS

| | | | |
|---|---|---|---|
| 5,377,803 | 1/1995 | Link et al. ............................ | 192/111 A |
| 5,570,768 | 11/1996 | Uenohara et al. . | |
| 5,667,049 | 9/1997 | Weidinger et al. .................. | 192/70.25 |
| 5,706,924 | 1/1998 | Bacher ................................. | 192/111 A |
| 5,806,647 | 9/1998 | Uehara ................................. | 192/70.25 |
| 5,816,379 | 10/1998 | De Briel et al. ..................... | 192/70.25 |

FOREIGN PATENT DOCUMENTS

| | | | |
|---|---|---|---|
| 195 06 698 A1 | 9/1996 | Germany . | |
| 97/01043 | 1/1997 | WIPO . | |
| 98/10201 | 3/1998 | WIPO . | |

*Primary Examiner*—Charles A Marmor
*Assistant Examiner*—Saúl Rodríguez
*Attorney, Agent, or Firm*—Cohen, Pontani, Lieberman & Pavane

[57] ABSTRACT

A friction clutch, especially for motor vehicles, includes a housing connectable with respect to rotation to a flywheel of an internal combustion engine. A pressure plate is arranged in the housing and is urged by a spring toward the flywheel. A clutch disk with friction facings is arranged between the pressure plate and the flywheel such that the spring presses the friction facings ot the clutch disk against the flywheel. A compensation device with at least one element which is changeable along its axial dimension compensates for the change in position of the pressure plate caused by wear of the friction facings, wherein the contact pressure force of the spring acts on the pressure plate via the compensation device. A play transmitter includes two levers, one arranged on each side of the compensation device. One of the levers penetrates the other lever. The penetrated lever includes a stop element which limits the axial movement of the penetrated lever.

9 Claims, 2 Drawing Sheets

FRICTION CLUTCH WITH AUTOMATIC WEAR COMPENSATION

BACKGROUND OF THE INVENTION

1. Field of the Invention

The present invention relates to a friction clutch, especially for motor vehicles, having an automatic wear compensation device. More particularly, the present invention relates to a friction clutch comprising a housing which is connectable with a flywheel of an internal combustion engine so as to be fixed with respect to rotation relative to the flywheel, a pressure plate arranged in the housing and acted upon by a spring for pressing a friction facing of a clutch disk against the flywheel, the friction clutch having a device with at least one element which changes its axial dimension, the device compensating for the change in position of the pressure plate caused by wear of the friction facings, wherein the contact pressure force of the spring acts on the pressure plate via the compensation device.

2. Description of the Related Art

A prior art friction clutch with a wear compensation device is known, for example, from reference DE 195 06 698 A1. This prior art friction clutch includes at least one play transmitter which contacts the flywheel and has an actuating lever portion which projects radially inward and cooperates with the wear compensation device. The wear compensation device comprises two adjustment rings which are inclined on their side surfaces that face one another and are rotatable relative to one another, so that their common axial longitudinal dimension may be changed. The rings are pretensioned relative to each other circumferentially by a spring. A problem with this prior art clutch is that when the clutch is transported or handled the play transmitter may move out of the housing, unless the clutch is connected with the flywheel, and project over the housing. In this position, the play transmitter is prone to being bent or otherwise damaged and thus impairing the operation of the friction clutch.

SUMMARY OF THE INVENTION

It is the object of the invention to provide a friction clutch with an automatic wear compensation device such that damage to a play transmitter of the wear compensation device is prevented during transportation and handling of the clutch.

To meet this object, the friction clutch of the present invention includes a housing rotatably fixedly connectable to a flywheel of an internal combustion engine. The housing is rotatably mounted about an axis of rotation. The friction clutch also has a pressure plate axially movably mounted in said housing and rotatable about the axis of rotation. A clutch disk having friction facings is rotatably mounted between said pressure plate and the flywheel. A spring urges said pressure plate toward the flywheel, thereby pressing said clutch disk against the flywheel. A wear compensation device has a changeable axial dimension operable for compensating for a change in position of said pressure plate caused by wear of said friction facings, wherein said spring urges said pressure plate via said device. The friction clutch also includes a play transmitter with a lever arranged on each side of the wear compensation device. One of the levers penetrates the other lever. The penetrated lever includes a stop element which limits its capacity to move in the axial direction.

The play transmitter is fully integrated inside the housing between the pressure plate and the housing and is accordingly reliably protected from damage during transportation or handling of the friction clutch before installation in a motor vehicle. Since the levers can be constructed so as to have approximately identical dimensions, they also have approximately the same mass so that they are insensitive to vibration.

The wear compensation device preferably comprises at least one adjustment ring which is provided with an inclination on its side surface and is rotatable relative to the pressure plate. It is especially advantageous when, as is already known from reference de 195 06 698, the wear compensation device comprises two adjustment rings which contact one another, are rotatable relative to one another and are each provided with at least one inclination on the side surfaces which face one another, wherein the adjustment rings are circumferentially pretensioned relative to one another.

A compact construction is made possible in that the levers are angled such that the penetrated lever with the stop element axially contacts the adjustment ring facing the spring, and the other lever is arranged between the other adjustment ring and the pressure plate.

The stop element preferably rests inside the housing during transportation and projects out of the housing during the first actuation of the clutch after the clutch is installed in the motor vehicle. The stop is constructed so as to spring radially inward or outward when the stop projects through the housing. The stop element may be drawn back into the housing during transport and handling of the friction clutch when a spring displaces the pressure plate toward the flywheel as far as possible given an appropriate dimensional arrangement, so that the stop element is protected against damage. In this position, the stop element contacts the housing opening from which it projects. The stop element is preferably a leaf spring for economical manufacture. The leaf spring may be riveted to the lever in a simple manner. To make the play transmitter as light as possible, the levers may be produced from sheet metal.

The lever which penetrates the other lever is preferably guided axially into a recess in the other lever, thus ensuring the penetration.

In this construction ol the transport protection, the operating position of the wear compensation device is produced after the clutch has been installed (connected with the flywheel) and after the first actuation of the clutch.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
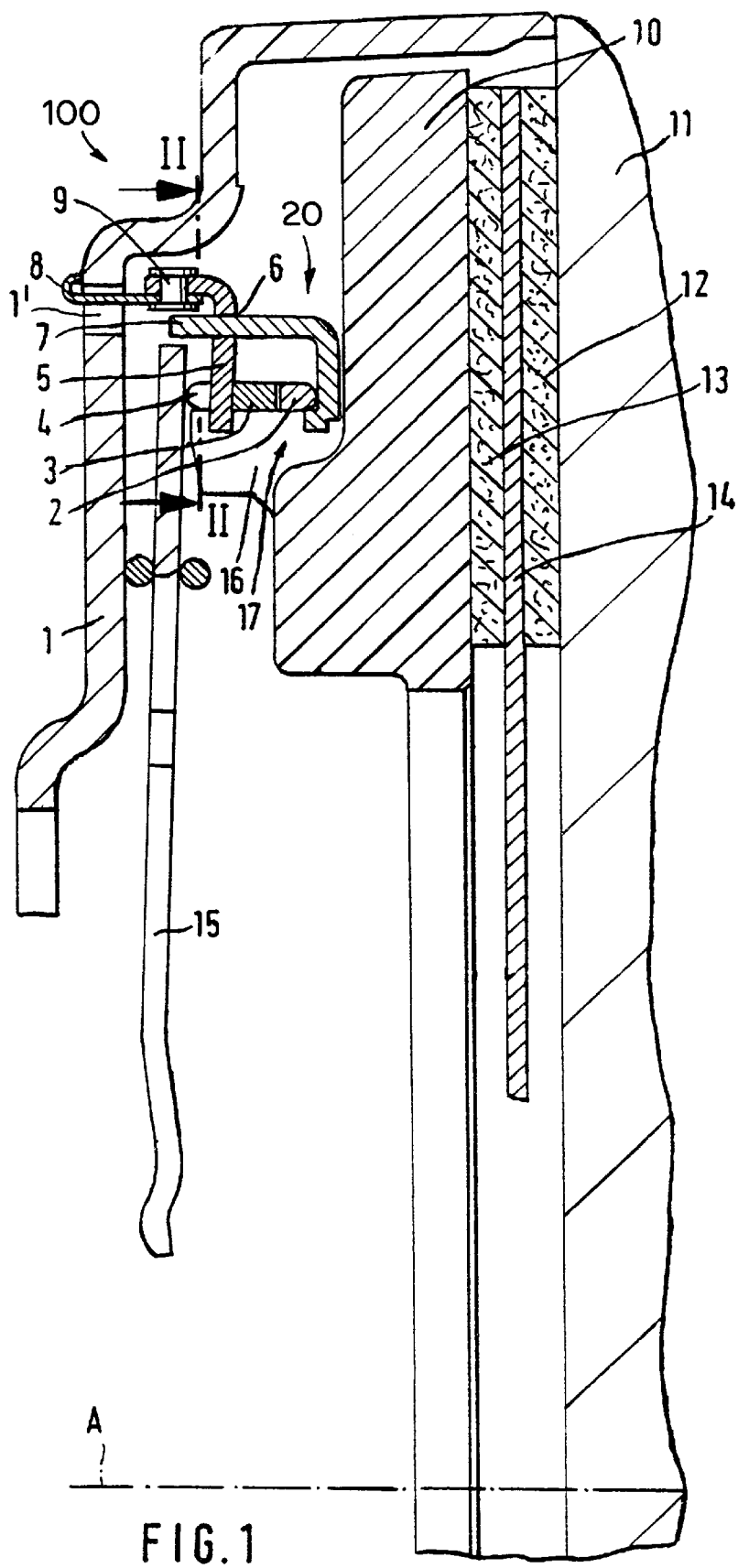
FIG. 1 is a partial longitudinal section through a friction clutch including automatic wear compensation in accordance with an embodiment of the present invention.
Figure 2:
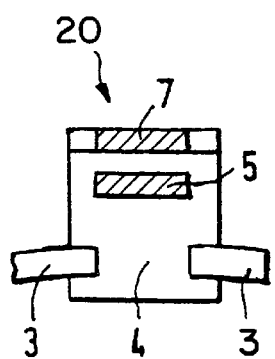
FIG. 2 is a sectional view of two levers used for automatic wear compensation of the friction clutch along line II—II of FIG. 1.

Referring to FIG. 1, a friction clutch 100 is connected by a housing 1 to a flywheel 11 of an internal combustion engine (the internal combustion engine is not shown in more detail) so that the housing 1 is fixed with respect to rotation relative to the flywheel 11 and rotates about an axis of rotation A. A pressure plate 10 is axially loaded by a diaphragm spring 15 and is concentrically arranged in the housing 1. The pressure plate 10 presses a clutch disk 14 provided with friction facings 12, 13 against the flywheel 11. The contact pressing force applied by the diaphragm spring 15 acts on the pressure plate 10 through a compensation device 17 including adjustment rings 2, 3 arranged on a projection 16 at the pressure plate 10. In a known manner, each of the adjustment rings 2, 3 includes an inclination on confrontingly opposed side surfaces and are arranged so as to be rotatable relative to one another. For this purpose, they are circumferentially pretensioned by a spring, not shown. When the adjustment rings 2, 3 are rotated relative to one another the inclinations run against one another and the common axial extension of the adjustment rings 2, 3 increases. Referring also to FIG. 2, a play transmitter 20 for wear compensation comprises first and second levers 5 and 7 which are both L-shaped. The second lever 7 is arranged between the adjustment ring 2 and the pressure plate 10. A longer of the two legs of the second lever 7 penetrates a recess 6 in the longer leg of the first lever 5, which is radially inwardly directed. The second lever 7 is guided axially into the recess 6. A radially inner end of the first lever 5 engages a corresponding recess 4 in the adjustment ring 3 and contacts the adjustment ring 3 axially with a certain force to create an equilibrium of forces between ring force, air forces and lever force. A stop element 8 comprising a leaf spring is connected to the first lever 5 with a rivet 9. The stop element 8 projects through a recess 1' in the housing 1. The end of the stop element 8 which projects through the recess 1' and out of the housing is bent radially outward to form a stop.

When the friction facings 12, 13 become worn, the pressure plate 10 travels further toward the flywheel 11 and the lever 7 participates in this movement along with the adjustment rings 2, 3 in that it is displaced relative to the first lever 5. The longer leg of the first lever 5 relieves the adjustment ring 3. During the next clutch release movement when the diaphragm spring 15 relieves the adjustment ring 3, the adjustment rings 2, 3 which are pretensioned relative to one another rotate until a force equilibrium is effected between the adjustment ring force, air forces and lever forces.

Figure 3:
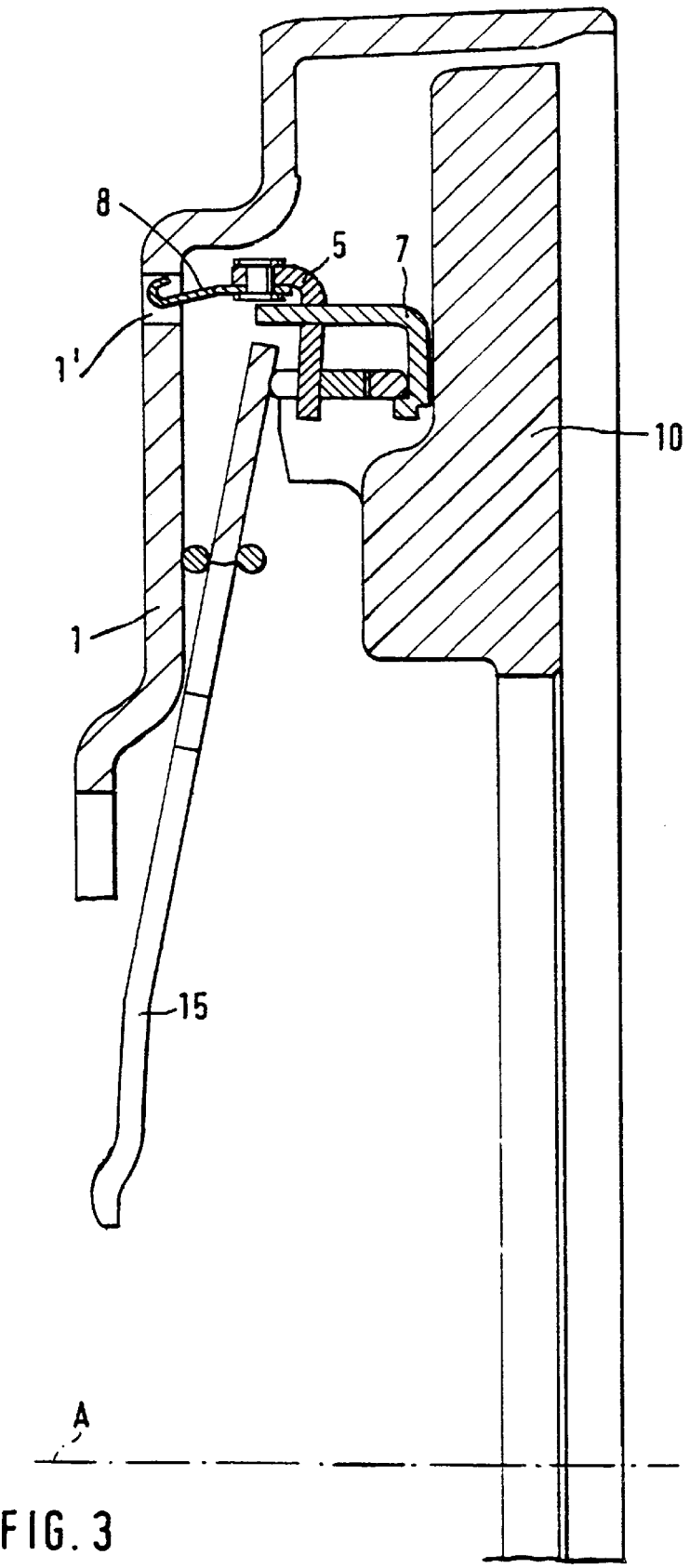
FIG. 3 is a partial longitudinal section view showing the friction clutch of FIG. 1 in a transport state.

As is clearly shown in FIG. 3, the stop element 8 may be bent radially inward to cancel the stop effect and may then be positioned in the recess 1' in the housing to protect the stop element 8 from damage during transport or handling. After the clutch housing 1 is installed in the motor vehicle and connected with the flywheel 11, not shown in FIG. 3, the first actuation of the clutch urges the pressure plate 10 toward the housing 1 so that the stop element 8 is pushed out of the housing 1. During that first actuation of the clutch, the radially outwardly bent end of the stop element 8 passes through the recess 1', and the bent end of the stop element 8 springs radially outward to again produce the stop effect.

The invention is not limited by the embodiments described above which are presented as examples only but can be modified in various ways within the scope of protection defined by the appended patent claims.

We claim:

1. A friction clutch for connection with a flywheel of an internal combustion engine, said friction clutch comprising:

a housing rotatably fixedly connectable to the flywheel and rotatable about an axis of rotation;

a pressure plate axially movably mounted in said housing and rotatable about the axis of rotation;

a clutch disk having friction facings rotatably mounted between said pressure plate and the flywheel;

a spring operatively connected for urging said pressure plate toward the flywheel, thereby pressing said clutch disk against the flywheel;

a wear compensation device having a changeable axial dimension operable for compensating for a change in position of said pressure plate caused by wear of said friction facings, wherein said spring urges said pressure plate via said wear compensation device;

a play transmitter comprising first and second levers;

said first lever arranged on a first axial side of said wear compensation device; and said second lever arranged on a second axial side of said wear compensation device opposite said first side, said second lever penetrating said first lever and said first lever comprising a stop element limiting axial movement of the first lever.

2. The friction clutch of claim 1, wherein said wear compensation device comprises at least one adjustment ring having an inclination on its side surface and being rotatably mounted relative to said pressure plate.

3. The friction clutch of claim 2, wherein said at least one adjustment ring comprises two adjustment rings contacting each other and rotatable relative to other, said two adjustment rings comprising inclinations on confrontingly opposed side surfaces, and wherein said two adjustment rings are circumferentially pretensioned relative to one another.

4. The friction clutch of claim 3, wherein said first and second levers are angled, said first lever axially contacting the adjustment ring facing said spring, and said second lever penetrating said first lever is arranged between said device and said pressure plate.

5. The friction clutch of claim 1, wherein said stop element comprises a bent end and said stop element springing in one of a radially inward and a radially outward direction when said bent end of said stop element projects out of said housing, said bent end thereby creating a stop effect.

6. The fiction clutch ot claim 5, wherein said stop element comprises a leaf spring.

7. The friction clutch of claim 6, wherein said leaf spring is connected to said first lever by a rivet.

8. The friction clutch of claim 1, wherein said first and second levers comprise sheet steel.

9. The friction clutch of claim 1, wherein said second lever is guided in a recess in said first lever.

* * * * *